US008000688B2

(12) United States Patent
Aaron

(10) Patent No.: US 8,000,688 B2
(45) Date of Patent: Aug. 16, 2011

(54) QUALITY OF SERVICE FOR GROUPED CELLULAR DEVICES

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 821 days.

(21) Appl. No.: 12/024,677

(22) Filed: Feb. 1, 2008

(65) Prior Publication Data
US 2009/0197585 A1    Aug. 6, 2009

(51) Int. Cl.
*H04Q 1/00* (2006.01)
(52) U.S. Cl. .............. 455/414.1; 455/418; 455/454
(58) Field of Classification Search .............. 455/456.1, 455/456.2, 456.3, 457, 466, 566, 517, 518, 455/519, 404.1, 404.2, 414.1, 453.1, 450, 455/451, 452.1, 454; 370/310, 328, 338; 709/204, 205, 220; 701/200, 213, 214; 705/5, 705/7, 14; 340/995.18, 988
See application file for complete search history.

(56) References Cited

U.S. PATENT DOCUMENTS

| | | | |
|---|---|---|---|
| 6,427,075 B1 * | 7/2002 | Burg et al. ............. | 455/422.1 |
| 6,982,969 B1 * | 1/2006 | Carneal et al. .......... | 370/329 |
| 7,734,297 B1 * | 6/2010 | Narkilahti et al. ....... | 455/452.2 |
| 2001/0049291 A1 * | 12/2001 | Sato et al. .............. | 455/503 |
| 2004/0148090 A1 * | 7/2004 | Melen .................... | 701/200 |
| 2005/0111418 A1 * | 5/2005 | Yang et al. .............. | 370/338 |
| 2007/0177555 A1 * | 8/2007 | Brueck et al. ........... | 370/338 |
| 2007/0195788 A1 * | 8/2007 | Vasamsetti et al. ...... | 370/395.21 |
| 2007/0275690 A1 * | 11/2007 | Hunter et al. ........... | 455/404.2 |
| 2008/0039123 A1 * | 2/2008 | Oh ........................ | 455/466 |
| 2008/0144525 A1 * | 6/2008 | Crockett et al. ......... | 370/254 |

* cited by examiner

*Primary Examiner* — Jean A Gelin
(74) *Attorney, Agent, or Firm* — Hope Baldauff Hartman, LLC

(57) ABSTRACT

Embodiments described herein provide for improving quality of service in a cellular network. A group of cellular devices is identified. Quality of service mechanisms are identified. A quality of service plan for coordinating an execution of quality of service mechanisms by the group is determined. The quality of service mechanisms are applied to the group of cellular devices in accordance with the quality of service plan.

14 Claims, 3 Drawing Sheets

QUALITY OF SERVICE FOR GROUPED CELLULAR DEVICES

BACKGROUND

This application relates generally to the field of cellular-related quality of service. More specifically, the disclosure provided herein relates to improving quality of service of grouped cellular devices.

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger.

To address QoS concerns, cellular service providers provide a number of QoS mechanisms in order to improve QoS. Conventionally, QoS mechanisms generally operate on individual cellular devices without consideration of other cellular devices and, in particular, surrounding cellular devices. Before cellular devices became more widespread, the conventional operation of QoS mechanisms adequately addressed most QoS issues. However, as cellular devices have become more pervasive, it has become increasingly common for cellular users to simultaneously utilize cellular devices within a close proximity, especially in urban and metropolitan areas. The simultaneous utilization of cellular devices in close proximity can reduce the effectiveness of the conventional operation of QoS mechanisms. For example, by not addressing the QoS impact of surrounding cellular devices, the conventional operation of QoS mechanisms may not account for co-interference between multiple cellular devices.

SUMMARY

Embodiments of the disclosure presented herein include methods, systems, and computer-readable media for improving quality of service in a cellular network. According to one aspect, a method for improving quality of service in a cellular network is provided. According to the method, a group of cellular devices is identified. Quality of service mechanisms are identified. A quality of service plan for coordinating an execution of quality of service mechanisms by the group is determined. The quality of service mechanisms are applied to the group of cellular devices in accordance with the quality of service plan.

According to another aspect, a system for improving quality of service in a cellular network is provided. The system includes a memory and a processor functionally coupled to the memory. The memory stores a program containing code for improving quality of service in a cellular network. The processor is responsive to computer-executable instructions contained in the program and operative to identify a group of cellular devices, identify quality of service mechanisms, determine a quality of service plan for coordinating an execution of quality of service mechanisms by the group, and apply the quality of service mechanisms to the group of cellular devices in accordance with the quality of service plan.

According to yet another aspect, a computer-readable medium having instructions stored thereon for execution by a processor to perform a method for improving quality of service in a cellular network is provided. According to the method, a group of cellular devices is identified. Quality of service mechanisms are identified. A quality of service plan for coordinating an execution of quality of service mechanisms by the group is determined. The quality of service mechanisms are applied to the group of cellular devices in accordance with the quality of service plan.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for improving quality of service of grouped cellular devices. In the following detailed description, references are made to the accompanying drawings that form a part hereof, and which are shown by way of illustration through specific embodiments or examples.

As used herein, a quality of service ("QoS") mechanism refers to any suitable technique for improving QoS for a cellular device. Examples of QoS mechanisms include, but are not limited to, cellular handoff, power control techniques, scheduled and coordinated data transmissions and receptions, and bandwidth reallocation techniques. Examples of cellular devices include, but are not limited to, cellular phones, smartphones, personal digital assistants ("PDAs"), and handheld gaming devices.

Conventionally, QoS mechanisms are applied to individual cellular devices without regard to other cellular devices and, in particular, surrounding cellular devices. However, applying QoS mechanisms in this manner may not be optimal, especially when multiple cellular devices are within a close proximity. In particular, the conventional way in which QoS mechanisms are applied may not account for QoS degradation of surrounding cellular devices. For example, multiple cellular devices operating in a close proximity may cause co-interference, which can significantly degrade QoS of the cellular devices.

The embodiments described herein provide coordinated QoS handling for grouped cellular devices. Instead of blindly applying QoS mechanisms to individual cellular devices, coordinated QoS handling involves applying QoS mechanisms to a group of cellular devices, accounting for unique considerations of the group. For example, coordinated QoS handling may take into account how each cellular device in the group affects the other cellular devices in the group. In this way, the overall QoS for the group of cellular devices is improved. The coordinated QoS handling may be managed by a central controller, by the group of cellular devices, or a combination thereof.

Figure 1:
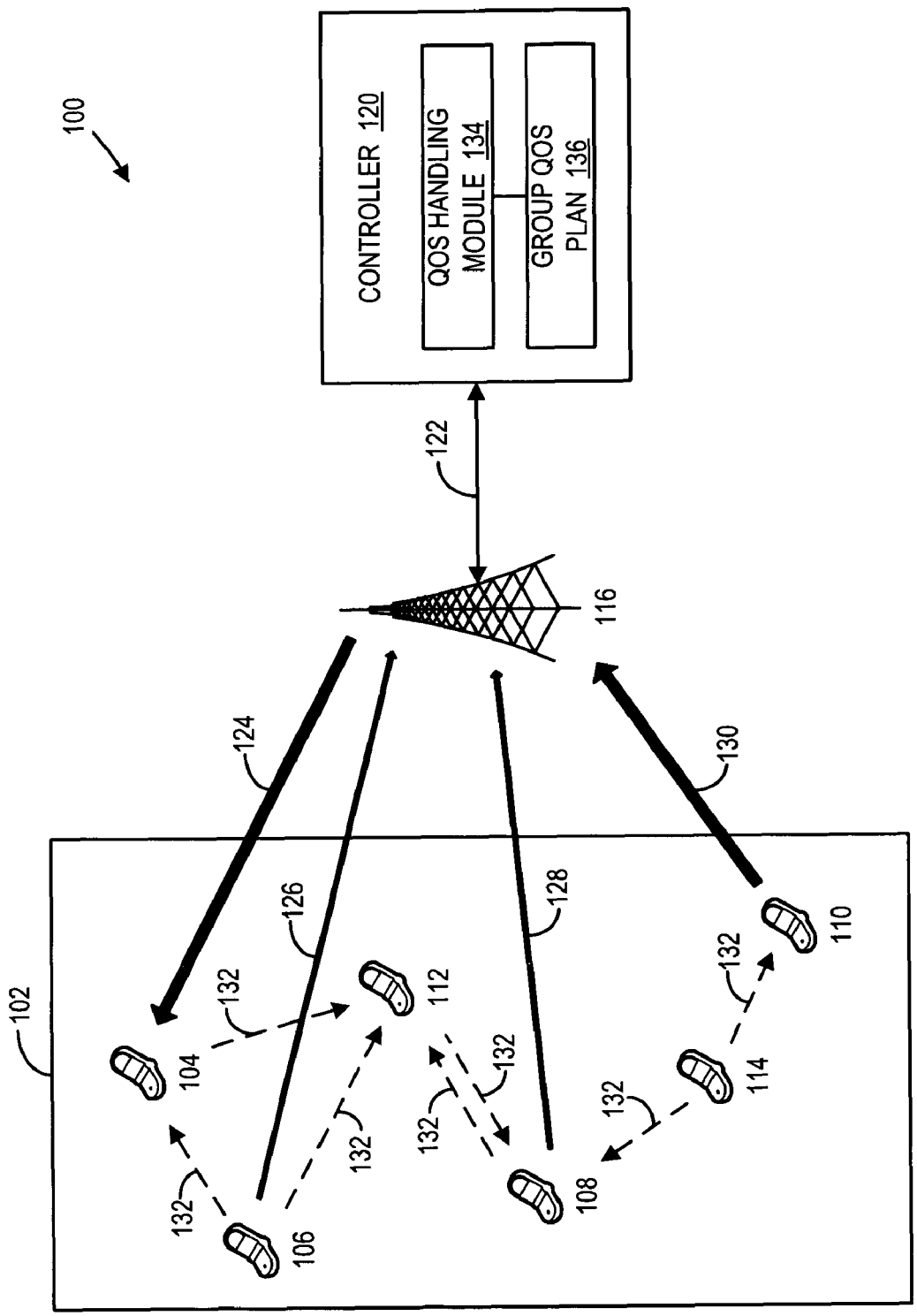
FIG. 1 is a simplified diagram illustrating a cellular network configuration in which cellular devices exchange coordination messages for improving cellular quality of service, in accordance with exemplary embodiments.

Referring now to the drawings, it is to be understood that like numerals represent like elements through the several figures, and that not all components and/or steps described and illustrated with reference to the figures are required for all embodiments. Turning now to FIG. 1, a simplified diagram illustrating an implementation of a cellular network 100 is shown, in accordance with exemplary embodiments. The cellular network 100 includes a group 102, which includes a first cellular device 104, a second cellular device 106, a third cellular device 108, a fourth cellular device 110, a fifth cellular device 112, and a sixth cellular device 114. The cellular devices 104, 106, 108, 110, 112, 114 may communicate with a cellular tower 116 and with each other via a plurality of wireless links (not shown). In one embodiment, transmissions to and from the cellular tower 116 are controlled by a controller 120, which is operatively coupled to the cellular tower 116 via a network 122.

As shown in FIG. 1, the first cellular device 104 receives data from the cellular tower 116 via a first solid arrow 124 pointing from the cellular tower 116 to the first cellular device 104. The second cellular device 106 transmits data to the cellular tower 116 via a second solid arrow 126 pointing from the second cellular device 106 to the cellular tower 116. Likewise, the third cellular device 108 transmits data to the cellular tower 116 via the a third solid arrow 128, and the fourth cellular device 110 transmits data to the cellular tower 116 via the fourth solid arrow 130. Both the third solid arrow 128 and the fourth solid arrow 130 point from the third cellular device 108 and the fourth cellular device 110, respectively, to the cellular tower 116. Although FIG. 1 simultaneously shows four solid arrows, each of which represents a direction of data flow, it should be appreciated that the data transmissions and receptions may or may not be concurrent. Also, it should be appreciated that any number of cellular devices may be in use.

In one embodiment, a thicker arrow represents a greater amount of data being transmitted, while a narrower arrow represents a lesser amount of data being transmitted. For example, streaming audio and video may require substantially more bandwidth than voice and text messaging. As shown in FIG. 1, the first solid arrow 124 and the fourth solid arrow 130 each transmit a first amount of data. The second solid arrow 126 and the third solid arrow 128 each transmit a second amount of data. The first amount of data is greater than the second amount of data.

In one embodiment, a QoS handling module 134 operating within the controller 120 manages the operation of QoS mechanisms for the group 102. In particular, the QoS handling module 134 may manage the operation of the QoS mechanism for the group 102 in accordance with a group QoS plan 136, which provides information detailing the manner in which the cellular devices 104, 106, 108, 110, 112, 114 execute the QoS mechanisms. In this case, the QoS handling module 134 transmits commands to the cellular devices 104, 106, 108, 110, 112, 114 instructing them to execute appropriate QoS mechanisms.

The way in which the QoS handling module 134 manages the operation of the QoS mechanisms and determines the commands transmitted to the cellular devices 104, 106, 108, 110, 112, 114 may depend, at least in part, on the amount of responsibility delegated to the cellular devices 104, 106, 108, 110, 112, 114. In a first embodiment, the cellular devices 104, 106, 108, 110, 112, 114 may have little or no input in the operation of QoS mechanisms. In this first embodiment, the commands may be determined by estimating the data transmissions and receptions performed by the cellular devices 104, 106, 108, 110, 112, 114. For example, historical data on past cellular device utilization may be used to predict future cellular device utilization. In a second embodiment, the cellular devices 104, 106, 108, 110, 112, 114 provide advanced notice of transmissions and receptions to the QoS handling module 134. In this second embodiment, the QoS handling module 134 personalizes QoS mechanisms according to the advanced notice provided by the cellular devices 104, 106, 108, 110, 112, 114. By personalizing the QoS mechanisms according to the advanced notice, the commands transmitted to the cellular devices 104, 106, 108, 110, 112, 114 may be more effective in improving QoS of the group 102.

For sufficiently large groups of cellular devices, the load on the controller 120 may exceed capacity. To reduce the load on the controller 120, the responsibility for managing the QoS mechanisms may be delegated, in part or in whole, to the cellular devices 104, 106, 108, 110, 112, 114. In one embodiment, at various times before, during, and/or after data is transmitted between the cellular tower 116 and each of the cellular devices 104, 106, 108, 110, 112, 114, coordination messages may be passed between the cellular devices 104, 106, 108, 110, 112, 114 to manage the execution of various QoS mechanisms. According to exemplary embodiments, the coordination messages are essentially a way for the cellular devices 104, 106, 108, 110, 112, 114 to communicate and share relevant information regarding the cellular devices 104, 106, 108, 110, 112, 114. The shared information may be used by the cellular devices 104, 106, 108, 110, 112, 114 and/or the controller 120 to optimally improve QoS for the group 102.

Each coordination message may serve one of three purposes: (1) a command; (2) a request; and (3) an informational message. As used herein, a "command" refers to an instruction from one cellular device to another cellular device to perform a QoS mechanism. For example, the second cellular device 106 may transmit a command to the first cellular device 104 instructing the first cellular device 104 to reduce the amount of power utilized by the first cellular device 104. As used herein, a "request" refers to a request for permission from one cellular device to another cellular device. For example, the first cellular device 104 may transmit a request to the fourth cellular device 110 asking the fourth cellular device 110 whether the first cellular device 104 is permitted to receive data from the cellular tower 116 at a given time.

As used herein, an "informational message" refers to any suitable indication between the cellular devices 104, 106, 108, 110, 112, 114. In one embodiment, the informational message includes an indication that an action has been performed or is about to be performed. For example, the first cellular device 104 may transmit an informational message to the fifth cellular device 112 indicating that the first cellular device 104 will receive data from the cellular tower 116 at a later time. In this way, the fifth cellular device 112 can, for example, adjust its transmissions in a way to reduce or eliminate co-interference with the first cellular device 104. In a further embodiment, the informational message includes a status message regarding a given cellular device. For example, the fifth cellular device 112 may transmit to the third cellular device 108 a status message indicating the battery life of the fifth cellular device 112.

The authorization and/or instruction by which the cellular devices 104, 106, 108, 110, 112, 114 transmit the coordination messages may be determined by the group QoS plan 136.

In particular, the QoS handling module 134 may transmit at least portions of the group QoS plan 136 to one or more of the cellular devices 104, 106, 108, 110, 112, 114. Upon receiving at least portions of the group QoS plan 136, the cellular devices 104, 106, 108, 110, 112, 114 can self-manage the execution of QoS mechanisms. It should be appreciated that even though the cellular devices 104, 106, 108, 110, 112, 114 self-manage the execution of QoS mechanisms, the QoS handling module 134 may still provide a significant role. For example, the QoS handling module 134 may monitor the effectiveness of the QoS mechanisms executed by the cellular devices 104, 106, 108, 110, 112, 114 and adjust the group QoS plan 136 accordingly.

As shown in FIG. 1, the dotted arrows 132 each represent a coordination message transmission from one cellular device to another cellular device. The second cellular device 106 transmits a coordination message to the first cellular device 104 and the fifth cellular device 112. The first cellular device 104 transmits a coordination message to the fifth cellular device 112. The third cellular device 108 and the fifth cellular device 112 exchange coordination messages with each other. The sixth cellular device 114 transmits coordination messages to the third cellular device 108 and the fourth cellular device 110. Although FIG. 1 simultaneously shows seven dotted arrows 132, each of which represents a direction in which a coordination message is transmitted, it should be appreciated that the coordination message transmissions may or may not be concurrent.

Figure 2:
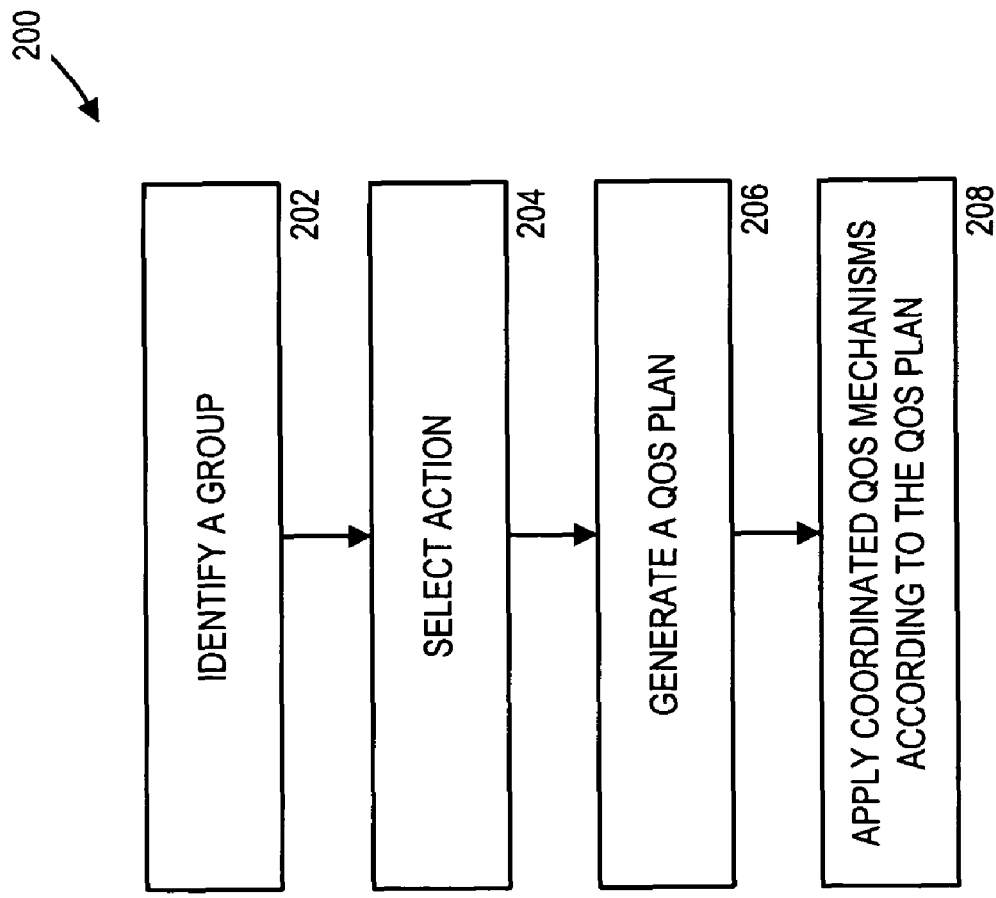
FIG. 2 is a flow diagram illustrating a method for improving quality of service for grouped cellular devices, in accordance with exemplary embodiments.

Turning now to FIG. 2, a flow diagram illustrating a method 200 for improving QoS for grouped cellular devices, such as the cellular devices 104, 106, 108, 110, 112, 114, is shown, in accordance with exemplary embodiments. According to the method 200, the QoS handling module 134 identifies (at 202) a group of cellular devices, such as the group 102. The group 102 may be formed based on distances between cellular devices 104, 106, 108, 110, 112, 114. For example, a threshold distance may be considered likely to cause co-interference between the cellular devices 104, 106, 108, 110, 112, 114. The distances between the cellular devices 104, 106, 108, 110, 112, 114 may be determined using any suitable technique, such as a global positioning system ("GPS"), tri-angulation, short-range signal measurements, and ranging.

The group 102 may also be formed based on a likelihood that the cellular devices 104, 106, 108, 110, 112, 114 will converge within the threshold distance. In this case, the QoS handling module 134 may utilize historical data regarding past movement of the cellular devices 104, 106, 108, 110, 112, 114, as well as geographic information system ("GIS") data regarding the presence of roads, obstacles, boundaries, and the like.

The group 102 may also be formed because the cellular devices 104, 106, 108, 110, 112, 114 within the group 102 are likely to remain within the threshold distance for a persistent period of time. In one embodiment, the cellular devices 104, 106, 108, 110, 112, 114 that are within the threshold distance remain stationary or have a low degree of motion. For example, cellular devices within an office building may have relatively little movement during business hours. In another example, the cellular devices 104, 106, 108, 110, 112, 114 that are within the threshold distance may move in parallel with similar speed and within angular thresholds. For example, two cellular devices being utilized simultaneously within a moving bus will move in parallel.

Instead of identifying a single group, such as the group 102, the QoS handling module 134 may also identify a plurality of candidate groups based, at least in part, on the factors described above. Then, based on QoS goals, actual groups may be selected from the candidate groups. For example, candidate groups that are more likely to benefit from the QoS handling module 134 may be selected as an actual group.

Upon identifying the group 102, the QoS handling module 134 selects (at 204) one or more QoS mechanisms for at least a portion of the cellular devices 104, 106, 108, 110, 112, 114 to execute. As previously described, QoS mechanisms may include, but are not limited to, cellular handoffs, data transmission controls (e.g., scheduled transmissions and receptions of data), power regulation controls (e.g., increasing and reducing transmission power), and bandwidth and other resource reallocation (e.g., allocating multiple frequencies, codes, and time slots). The QoS mechanisms may be selected based on their applicability to QoS goals that the cellular service provider, for example, may seek to accomplish.

Upon selecting the QoS mechanisms, the QoS handling module 134 generates (at 206) a QoS plan, such as the group QoS plan 136, by coordinating the QoS mechanisms to be executed by the cellular devices 104, 106, 108, 110, 112, 114. The QoS mechanisms may be coordinated based on QoS goals and standards provided by the service provider. For example, QoS goals may include guidelines for accomplishing a level of QoS for certain classes of cellular devices in certain circumstances, while a standard may include minimum thresholds that each of the cellular devices 104, 106, 108, 110, 112, 114 must maintain. The minimum threshold may require that a QoS mechanism which benefits the QoS of one cellular device cannot reduce the QoS of another cellular device below the minimum threshold.

The QoS mechanisms may be coordinated based on a number of suitable criteria including, but not limited to, a schedule for executing the QoS mechanisms, a magnitude for each QoS mechanism, and a duration for each QoS mechanism. The schedule may specify, for example, which of the cellular devices 104, 106, 108, 110, 112, 114 execute QoS mechanisms, which QoS mechanisms are executed by each of the cellular devices 104, 106, 108, 110, 112, 114, and at what time each QoS mechanism is executed. The schedule may further include the magnitude and duration at which each of the QoS mechanisms is executed. In one embodiment, the coordinated QoS mechanisms specified by the group QoS plan 136 are filtered according to given criteria. For example, the coordinated QoS mechanisms may be filtered based on known cellular optimization and modeling techniques directed towards improving cellular QoS. The QoS plan may thus include one or more each of schedules, magnitudes, durations, if-then rules to guide the coordination, filtering rules, delegations of particular responsibilities, and the like. It should be noted that these items may be specified to apply to the group as a whole, to a particular defined and identified subset of a group, or to a particular group member.

Upon generating the group QoS plan, the QoS handling module 134 applies (at 208) the coordinated QoS mechanisms to the cellular devices 104, 106, 108, 110, 112, 114 according to the group QoS plan 136. In one embodiment, the coordinated QoS mechanisms are applied to the cellular devices 104, 106, 108, 110, 112, 114 by transmitting instructions to the cellular devices 104, 106, 108, 110, 112, 114 to execute appropriate QoS mechanisms according to the group QoS plan 136. In this case, the QoS handling module 134 and the controller 120 solely determine which QoS mechanisms are executed by the cellular devices 104, 106, 108, 110, 112, 114. However, for groups with a large number of cellular devices, the load on the controller 120 may exceed capacity.

To reduce a potentially heavy load on the controller 120, at least portions of the group QoS plan 136 may be transmitted to one or more of the cellular devices 104, 106, 108, 110, 112,

114. In this way, the cellular devices 104, 106, 108, 110, 112, 114 can determine which QoS mechanisms are executed according to the group QoS plan 136, with partial aid or without aid from the controller 120. In one embodiment, each of the cellular devices 104, 106, 108, 110, 112, 114 transmits coordination messages to the other cellular devices 104, 106, 108, 110, 112, 114 in the group 102 according to the group QoS plan 136.

In one embodiment, the QoS handling module 134 also monitors the effectiveness of the QoS mechanisms executed by the cellular devices 104, 106, 108, 110, 112, 114. If the effectiveness of the QoS mechanisms executed by the cellular devices 104, 106, 108, 110, 112, 114 decreases below an effectiveness threshold, then corrective actions can be taken. The corrective actions may be taken by the cellular devices 104, 106, 108, 110, 112, 114 and/or the QoS handling module 134. For example, the cellular devices 104, 106, 108, 110, 112, 114 can take relatively minor corrective action, such as adjusting the schedule of the QoS mechanisms, while the QoS handling module 134 can take relatively major corrective actions, such as changing the group QoS plan 136.

The QoS handling module 134 may further monitor the configuration of the group 102. For example, when one of the cellular devices 104, 106, 108, 110, 112, 114 moves an adequate distance away from the other cellular devices 104, 106, 108, 110, 112, 114 in the group 102, then the QoS handling module 134 may decide to restructure the group 102. In the alternative, the group 102 may be dissolved entirely.

As an illustrative example, referring once again generally to FIG. 1, the controller 120 may transmit a group plan to a subset of the defined group, namely cellular devices 104 and 110. These group members (i.e., the cellular devices 104, 110) may convey the plan, or at least portions of the plan, to the remaining group members (i.e., the cellular devices 106, 108, 112, and 114). The group plan may delegate control responsibility to the cellular device 112, such that it controls the scheduling of transmit and receive times for the cellular devices 104, 106, and 108 in addition to its own transmit and receive scheduling. The cellular device 110 may retain control for such scheduling for itself and the cellular device 114, perhaps because they are slightly removed from the rest of the group. For example, they may be in the same building but on a different floor. Thus, the cellular device 112 may receive the entire group plan, but the remaining members other than the cellular device 104 and 110 only need the group plan portions unrelated to the delegation and scheduling control.

The cellular devices 110 and 112 may begin controlling the scheduling aspects of their respective member sets so as to avoid simultaneity of transmits and receives that would engender co-interference QoS degradation due to close proximity. The scheduling may be done via requests to transmit and receive, where the cellular device 112 replies with permissions to transmit based on one of the many techniques known in the art for such scheduling. Alternately, fixed schedules may be included in the group plan, where time slots and ordering are pre-determined. Additionally, power control rules provided in the group plan may specify that the cellular device 104 must reduce its power whenever the cellular device 106 wishes to receive. In this case, the cellular device 106 may be a premium customer who has paid for higher quality service, and thus should not be subject to high power transmission co-interference caused by the cellular device 104, which is historically known to frequently transmit many high power signals associated with high-bandwidth services.

It should be noted that some aspects of the group plan may be partly or fully implemented via the cellular tower 116 and its associated cellular network equipment, instead of or in addition to being implemented by the cellular devices 104, 106, 108, 110, 112, 114. These may include handoff and resource control, such handing off the cellular device 104 when its activities would otherwise cause unacceptable QoS degradation of the other group members. For example, transmissions from the cellular device 104 may cause unmanageably high levels of co-interference to other group members that are receiving. Additionally, resource control decisions may be made by the cellular tower 116. An example of a resource control decision may include re-allocating codes, frequencies, time slots, and the like either autonomously in accordance with the group plan, or in a fashion coordinated with activities instigated by the various group members (e.g., coordinated with the transmit and receive scheduling being controlled by the cellular devices 110 and 112).

The mix of cellular device control versus control by the cellular tower 116 may depend upon the cellular technology in effect in terms of type, version, mode of operation, and the like. During the time in which the group plan is in effect, the controller 120 may become aware that unacceptable results (e.g., exceeding predetermined thresholds) either via periodic evaluation or via error messages sent when problems occur, and may determine that this is associated with the transmit and receive scheduling that has been delegated to the cellular device 112. The controller 120 may determine or infer that the cellular device 112 is no longer doing this scheduling as intended, perhaps because its battery has been drained or its connectivity has been lost due to being placed inside a metal desk drawer. The controller 120 may then assume the scheduling for the affected cellular devices 104, 106, and 108. Other feedback may eventually reach the controller 120, which may adjust the group plan and transmit the new group plan to the group. This may occur when the third cellular device 108 leaves the group (e.g., leaves the vicinity or is turned off). The group plan may also have been modified when the cellular device 112 previously became unavailable, if the controller 120 determined that such modification was necessary.

Eventually, when retaining the group is no longer worth the effort or is in some sense counterproductive, perhaps when the size of the group has dwindled to just a few members, but especially when it has dwindled to just one member, the controller 120 may dissolve the group, sending messages to the remaining group member or members to cease group action, and then terminate the defined group in question. Individual group members which have already left the group may or may not receive group termination messages upon leaving, but if they receive no such messages, their group functionality can still be pre-configured to eventually timeout a set time after group operations have ceased from its perspective, ensuring that group functions are in practice terminated as appropriate.

Figure 3:
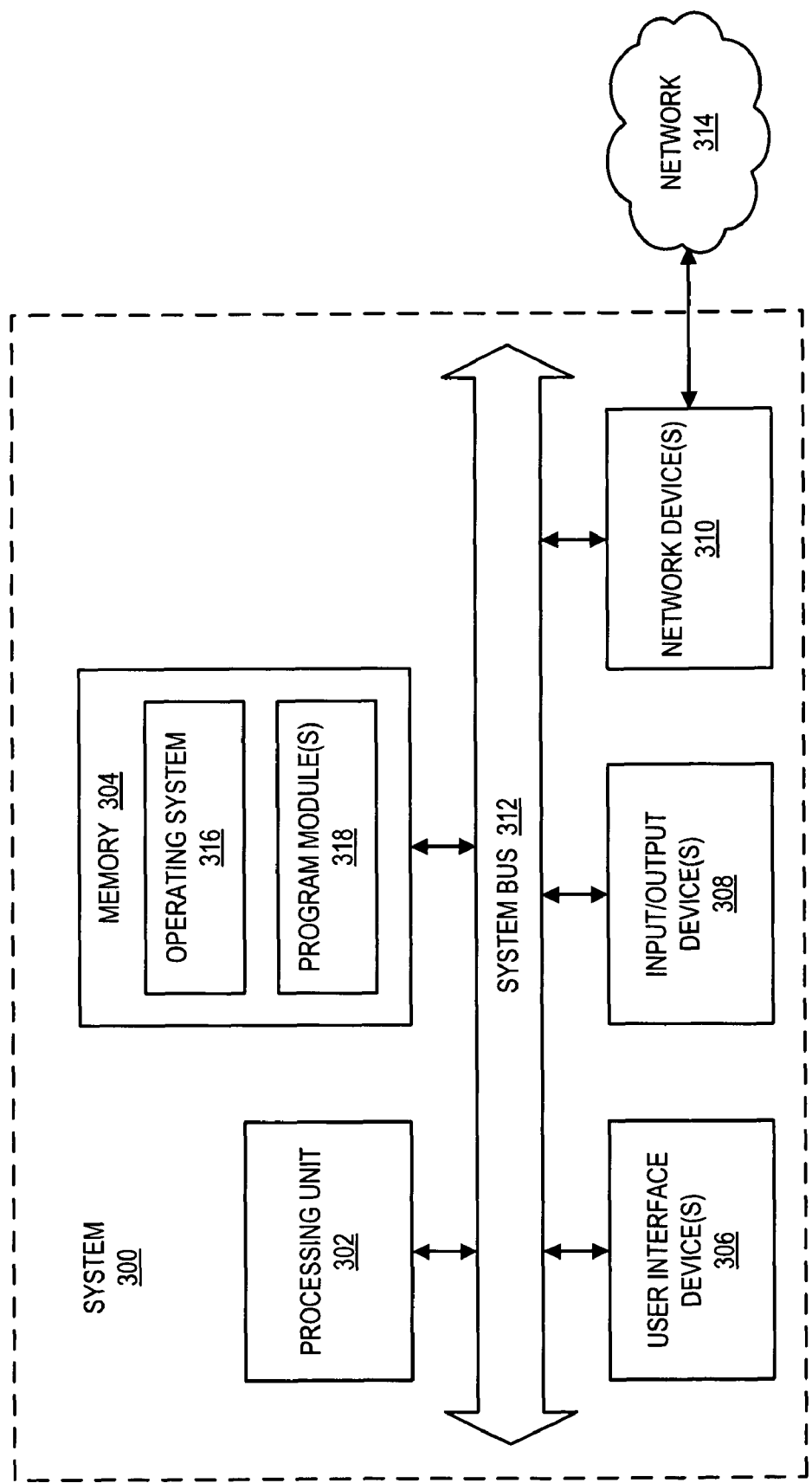
FIG. 3 is a block diagram illustrating the system configured to improve quality of service for grouped cellular devices, in accordance with exemplary embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300 configured to improve QoS for grouped cellular devices, such as the cellular devices 104, 106, 108, 110, 112, 114, in accordance with exemplary embodiments. Examples of the computer system 300 may include the cellular devices 104, 106, 108, 110, 112, 114 and the controller 120. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 318 include the QoS handling module 134. In one embodiment, the program modules 318 are embodied in computer-readable media containing instructions that, when executed by the processing unit 302, performs the method 200 for improving QoS for grouped cellular devices, as described in greater detail above with respect to FIG. 2. According to further embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network 314. Examples of the network 314 may include the network 122, wireless links (not shown) between the cellular devices 104, 106, 108, 110, 112, 114 and the cellular tower 116, and wireless links (not shown) between the cellular devices 104, 106, 108, 110, 112, 114. Examples of the network devices 310 may include, but are not limited to, a modem, a radio frequency ("RF") or infrared ("IR") transceiver, a telephonic interface, a bridge, a router, or a network card. The network 314 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 314 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for improving quality of service in a cellular network, comprising:
    identifying a group of cellular devices;
    identifying quality of service mechanisms comprising cellular handoff, power control, and bandwidth reallocation;
    determining a quality of service plan for coordinating an execution of the quality of service mechanisms by the group, the quality of service plan comprising information indicating which of the cellular devices in the group execute which of the quality service mechanisms, a magnitude at which the quality of service mechanisms are executed, and duration at which the quality of service mechanisms are executed; and applying the quality of service mechanisms to the group of cellular devices in accordance with the quality of service plan.

2. The method of claim 1, wherein identifying a group of cellular devices comprises identifying the cellular devices within a threshold distance, the threshold distance indicating a likelihood of co-interference.

3. The method of claim 1, wherein the quality of service mechanisms further comprise a schedule indicating when each of the group of cellular devices is allowed to transmit and receive data.

4. The method of claim 1, wherein applying the quality of service mechanisms to the group of cellular devices in accordance with the quality of service plan comprises:

transmitting instructions to selected cellular devices in the group in accordance with the quality of service plan, the instructions instructing the selected cellular devices to execute at least one of the quality of service mechanisms in accordance with the quality of service plan.

5. The method of claim 1, further comprising:

upon applying the quality of service mechanisms to the group of cellular devices in accordance with the quality of service plan, receiving feedback from the group of cellular devices; and adjusting the quality of service plan based on the feedback.

6. A system for improving quality of service in a cellular network, comprising:

a memory for storing a program containing code for improving quality of service in the cellular network; and a processor functionally coupled to the memory, the processor being responsive to computer-executable instructions contained in the program and operative at least to:

identify a group of cellular devices, identify quality of service mechanisms comprising cellular handoff, power control, and bandwidth reallocation, determine a quality of service plan for coordinating an execution of the quality of service mechanisms by the group, the quality of service plan comprising information indicating which of the cellular devices in the group execute which of the quality service mechanisms, a magnitude at which the quality of service mechanisms are executed, and a duration at which the quality of service mechanisms are executed, and apply the quality of service mechanisms to the group of cellular devices in accordance with the quality of service plan.

7. The system of claim 6, wherein the quality of service mechanisms further comprise a schedule indicating when each of the group of cellular devices is allowed to transmit and receive data.

8. The system of claim 6, wherein to apply the quality of service mechanisms to the group of cellular devices in accordance with the quality of service plan, the processor is further operative at least to:

transmit instructions to selected cellular devices in the group in accordance with the quality of service plan, the instructions instructing the selected cellular devices to execute at least one of the quality of service mechanisms in accordance with the quality of service plan.

9. The system of claim 6, wherein the processor is further operative at least to:

upon applying the quality of service mechanisms to the group of cellular devices in accordance with the quality of service plan, receive feedback from the group of cellular devices, and adjust the quality of service plan based on the feedback.

10. A computer-readable medium having instructions stored thereon for execution by a processor to provide a method for improving quality of service in a cellular network, the method comprising:

identifying a group of cellular devices;

identifying quality of service mechanisms comprising cellular handoff, power control, and bandwidth reallocation;

determining a quality of service plan for coordinating an execution of the quality of service mechanisms by the group, the quality of service plan comprising information indicating which of the cellular devices in the group execute which of the quality service mechanisms, a magnitude at which the quality of service mechanisms are executed, and a duration at which the quality of service mechanisms are executed; and applying the quality of service mechanisms to the group of cellular devices in accordance with the quality of service plan.

11. The computer-readable medium of claim 10, wherein identifying a group of cellular devices comprises identifying the cellular devices within a threshold distance, the threshold distance indicating a likelihood of co-interference.

12. The computer-readable medium of claim 10, wherein the quality of service mechanisms further comprise a schedule indicating when each of the group of cellular devices is allowed to transmit and receive data.

13. The computer-readable medium of claim 10, wherein applying the quality of service mechanisms to the group of cellular devices in accordance with the quality of service plan comprises:

transmitting instructions to selected cellular devices in the group in accordance with the quality of service plan, the instructions instructing the selected cellular devices to execute at least one of the quality of service mechanisms in accordance with the quality of service plan.

14. The computer-readable medium of claim 10, the method further comprising:

upon applying the quality of service mechanisms to the group of cellular devices in accordance with the quality of service plan, receiving feedback from the group of cellular devices; and adjusting the quality of service plan based on the feedback.

* * * * *